(12) United States Patent
Lindstrom et al.

(10) Patent No.: US 11,108,111 B2
(45) Date of Patent: Aug. 31, 2021

(54) BACKPLANE ASSEMBLY WITH POWER AND COOLING SUBSTRUCTURES

(71) Applicant: CORVUS ENERGY INC., Richmond (CA)

(72) Inventors: Jeremy Lindstrom, Richmond (CA); Jerome Ronne, Richmond (CA); Angelo Faccone, Richmond (CA)

(73) Assignee: CORVUS ENERGY INC, Richmond (CA)

( * ) Notice: Subject to any disclaimer, the term of this patent is extended or adjusted under 35 U.S.C. 154(b) by 110 days.

(21) Appl. No.: 16/095,277

(22) PCT Filed: Apr. 20, 2017

(86) PCT No.: PCT/CA2017/050489
§ 371 (c)(1),
(2) Date: Oct. 19, 2018

(87) PCT Pub. No.: WO2017/181282
PCT Pub. Date: Oct. 26, 2017

(65) Prior Publication Data
US 2019/0140229 A1 May 9, 2019

Related U.S. Application Data

(60) Provisional application No. 62/325,372, filed on Apr. 20, 2016.

(51) Int. Cl.
*H01M 50/20* (2021.01)
*H01M 10/613* (2014.01)
(Continued)

(52) U.S. Cl.
CPC ......... *H01M 50/20* (2021.01); *H01M 10/613* (2015.04); *H01M 10/656* (2015.04);
(Continued)

(58) Field of Classification Search
CPC .......... H01M 2/1077; H01M 10/6551; H01M 10/656; H01M 10/6566; H01M 10/613;
(Continued)

(56) References Cited

U.S. PATENT DOCUMENTS

| | | | |
|---|---|---|---|
| 6,365,297 | B1 | 4/2002 | Wolczak et al. |
| 6,909,614 | B2 | 6/2005 | Beihoff et al. |

(Continued)

FOREIGN PATENT DOCUMENTS

| | | |
|---|---|---|
| EP | 2693519 A1 | 2/2014 |
| EP | 2975670 A1 | 1/2016 |

(Continued)

OTHER PUBLICATIONS

International Search Report and Written Opinion in corresponding International Application No. PCT/CA2017/050489 dated Aug. 2, 2017 (11 pages).

(Continued)

*Primary Examiner* — Maria Laios
(74) *Attorney, Agent, or Firm* — Venable LLP; Michele V. Frank (57) ABSTRACT

There is provided a backplane assembly with a power substructure and a cooling substructure. Battery modules may be engaged with the backplane assembly. When engaged, power connectors in the power substructure engage with corresponding power connectors on the battery modules. A cooling fluid moving through the cooling substructure is directed toward the battery modules so as to cool the battery modules during operation. The backplane assembly may additionally include an exhaust substructure. Gases vented by the battery modules move through the exhaust substructure and are directed away from the backplane assembly.

22 Claims, 8 Drawing Sheets

(51) Int. Cl.
*H01M 10/6551* (2014.01)
*H01M 10/656* (2014.01)
*H01M 50/502* (2021.01)
*H01M 10/6556* (2014.01)

(52) U.S. Cl.
CPC ... *H01M 10/6551* (2015.04); *H01M 10/6556* (2015.04); *H01M 50/502* (2021.01)

(58) Field of Classification Search
CPC .......... H01M 10/655; H01M 10/6561; H01M 2010/4278; H01M 50/35; H01M 50/358
See application file for complete search history.

(56) References Cited

U.S. PATENT DOCUMENTS

| | | | |
|---|---|---|---|
| 7,892,670 B2 | 2/2011 | Aiello et al. | |
| 8,642,204 B2* | 2/2014 | Higashino | B60K 1/04 |
| | | | 429/149 |
| 2004/0168818 A1* | 9/2004 | Layden | H02J 7/0042 |
| | | | 174/50 |
| 2006/0056142 A1 | 3/2006 | Takahashi et al. | |
| 2012/0315521 A1* | 12/2012 | Nissels | H01M 10/0472 |
| | | | 429/90 |
| 2013/0288096 A1* | 10/2013 | Frutschy | H01M 2/1077 |
| | | | 429/99 |
| 2015/0010795 A1 | 1/2015 | Tanigaki et al. | |
| 2015/0373874 A1* | 12/2015 | Kinney | H05K 7/206 |
| | | | 62/3.6 |
| 2016/0021782 A1* | 1/2016 | Kurosaki | H01M 10/6563 |
| | | | 429/71 |
| 2016/0093843 A1 | 3/2016 | Reineccius et al. | |
| 2017/0077566 A1* | 3/2017 | Mascianica | H01M 50/20 |

FOREIGN PATENT DOCUMENTS

| | | |
|---|---|---|
| JP | 2006-351311 A | 12/2008 |
| JP | 2012-226915 A | 11/2012 |
| JP | 2015-109153 A | 6/2015 |

OTHER PUBLICATIONS

International Preliminary Report on Patentability in corresponding International Application No. PCT/CA2017/050489 dated Oct. 23, 2018 (7 pages).

Extended European Search Report in corresponding European Application No. 17785204.3 dated Feb. 5, 2020 (7 pages).

* cited by examiner

BACKPLANE ASSEMBLY WITH POWER AND COOLING SUBSTRUCTURES

FIELD OF THE DISCLOSURE

The present disclosure relates to a backplane assembly for engaging with a plurality of battery modules, and more particularly to a battery rack with an integrated backplane assembly.

BACKGROUND TO THE DISCLOSURE

One type of rechargeable battery is a lithium-ion battery having a multiple-layered structure comprising a positive electrode activated by various mixed oxides or olivines, a negative electrode activated by special carbon, and a separator all immersed in an organic electrolyte. The battery is typically housed in an enclosure to form a battery module. During normal operating conditions, electrical energy is converted to and stored as chemical energy during charging, and stored chemical energy is converted to electrical energy during discharging. More particularly, during charging, lithium in the positive electrode is ionized and moves from layer to layer to the negative electrode; during discharging, the ions move to the positive electrode and return to its original compound. Multiple lithium-ion battery modules can be mounted on a rack assembly to form a battery pack.

There are various problems with current racks for battery modules. Battery modules typically include positive and negative connectors on their front face, to which power cable assemblies are connected to form a string of modules terminating at a switchgear (or pack controller). Coolant inlet and outlet connections are typically also provided on the front face of the battery module. External flexible hoses connect these coolant fittings to external rigid pipes mounted on the front surfaces of the rack system. Such connections are often difficult and labour-intensive to install and service, are subject to poor manufacturing quality due to crimping issues, and still further are easy to miss-wire by the installer/servicer, which can lead to a short circuit. Furthermore, as the cables are often exposed on the front face of the rack they are subject to impact/mechanical damage from other equipment or activity. With the cabling exposed on the front face of the modules, battery packs are also at a risk of coolant leaks where coolant can spill onto the floor in the immediate area of the battery room leading to unsafe conditions.

With current battery packs, installation/servicing of a battery module is also a relatively involved process. In order to install or remove a module from the battery pack, connection/disassembly of all of the individual interfaces mentioned above is generally required until the module is free to be installed/removed from the rack.

Still further, multiple cable lengths are often required to accommodate the various physical arrangements of the battery modules. This can result in complex and excessively long power circuits. Often the power circuit will cross over itself with the cable jackets in contact with one another, leading to potential hot spots. The overall loop area formed as a result of the cabling can be large, potentially causing electromagnetic interference (EMI) issues.

Lithium-ion batteries mentioned above are popular in the maritime industry. The batteries are typically operated 24 hours a day, and most days of the year. Because of these high energy demands placed on the batteries, it is important to regularly monitor their performance and ensure that during their lifetime they are adequately meeting safety requirements.

Battery modules suffering from poor performance are more prone to experience what is known in the industry as "thermal runaway". For example, in certain extreme circumstances of over-voltage, over-current or over-temperature, a condition known as "self-heating" can occur within a lithium-ion battery, which can cause the battery to enter thermal runaway. Self-heating is a condition wherein the internal electro-chemical structure of a battery cell causes the temperature therein to increase. Thermal runaway occurs when the internal temperature in the battery tell increases to a level wherein a chemical reaction occurs and flammable gases are released. If there is sufficient oxygen within the enclosure that houses the battery cell, the flammable gases will ignite and release a significant amount of energy. The effects of thermal runaway in a single battery module can be quite dramatic and damaging. When a thermal runaway occurs, small amounts of oxygen are generated and the internal temperature rises to greater than 800° C. The combination of these events can lead to an internal fire, excessive gassing and, subsequently, a breakdown of the enclosure surrounding the lithium ion cells. Prevention of a thermal runaway is of extreme importance, and cooling systems used to keep battery module temperatures within acceptable ranges must therefore be as efficient as possible.

In view of the various problems facing prior art battery racks, especially those used in the maritime industry, it is desirable to provide a solution to at least some of the challenges faced by the prior art.

SUMMARY OF THE DISCLOSURE

The following description is intended to provide an overview of the disclosure in general terms, and is not to be seen as limiting on the scope of the disclosure.

There is described a battery racking structure with a backplane comprising an integrated assembly. The rack with backplane may provide the necessary functionality for running the battery modules without the need for any additional external connectors, cables, tubing, hoses, or ventilation ducts. The rack may provide the necessary interface connections simply by sliding the module into a module bay or battery bay and fastening with fasteners or some other locking mechanism.

Blind mate connections may be automatically formed by sliding and locking a battery module in an operational position in the racking structure. Power connections may be formed when power pins at the rear of the battery module engage with power sockets secured within the backplane assembly (or, in the reverse case, power pins in the backplane assembly engage with sockets at the rear of the battery module).

The power sockets may each be connected to busbars such that, when all the battery modules are installed within the rack, a complete series string is formed, with both ends of the string (positive and negative) terminating at the a power switchgear device or pack controller. The interconnecting busbars may be flexible to allow for slight misalignment, therefore allowing a correct fit with minimal force necessary to seat the connectors.

In a module's operational position, optical connections may be formed when optical ports at the rear of the battery module come within sufficient proximity of optical ports secured within the backplane assembly. The optical medium is preferably inexpensive low-bandwidth light pipe material. The optical interface air gap is able to sufficiently tolerate misalignment such that generally no high-precision components or special alignment/calibration procedures are required to ensure correct alignment.

The battery module may be equipped with one or more male/female exhaust ports which provide a seal under normal battery operational conditions. If there should arise a condition of high cell temperature with an associated pressure rise, one or more battery cells may vent toxic gases. Under this condition, the exhaust seals will open by melting away (or will open by pressure) from the high gas temperature and thus releasing and directing the gases externally to the battery module. The backplane assembly may be equipped with matching female/male exhaust ports that accept the male module ports. In the case of a gas exhaust event, the gases may be directed safely into the backplane assembly and may be further directed to a safe handling location such that no gases will escape into the immediate vicinity of the battery system.

In the case of an air-cooled rack, the rack backplane may be equipped with an integrated air delivery system such that cooling air is directed forward and over/through a finned heat sink structure on each battery module. The heated air may then be exhausted at the front face of the rack assembly. Such a configuration may be preferred if for example cold air in the room is predominantly at floor level. The air delivery system may be positioned at the bottom of the rack, near floor level, and may push or pull air through the backplane assembly. Alternatively, with the air delivery system located the top of the rack, cold air may be pushed down the backplane from the top of the rack assembly to the bottom, and may then be ejected out the bottom of the rack assembly at floor level. In this same configuration the air may instead be pulled up through the backplane assembly (with the air delivery system located at the top of the rack) and ejected at the top. The preferred configuration is generally the one with an air delivery system located at the bottom of the rack and arranged to draw (or pull) air into the backplane assembly. The air delivery system may be configured to accommodate different battery module arrangements, including modules with single heat sinks and modules with dual heat sinks (one on the top of the battery module and one on the bottom of the battery module).

Each battery module may be equipped with an integrated cooling plate with an inlet and outlet arranged to connect to corresponding coolant delivery connections within the backplane assembly. Coolant may therefore be directed through the battery module to thereby cool the battery module.

In the case of a vertically oriented rack, the switchgear or pack controller is preferably located within a topmost or bottommost bay, thus allowing for a simple loop arrangement of the power circuit. For example, with the pack controller located in the top left bay, the power connections can proceed down the left side of the rack, turn around at the bottom of the rack, and then proceed up the right side of the rack. In order to minimize the length and complexity of the power distribution busbars, each battery module may be designed with its power ports arranged at the rear of the module, to one side, and also vertically (one above the other) such that, when modules are loaded into a rack that is for example 2-bay in width and 6-bay in height, the power ports within each column of batteries are aligned vertically. Furthermore, as a result all the power ports are adjacent to and closer to the centerline of the rack than to either of the rack's sides.

As mentioned above, by installing the battery modules with different vertical orientations for each column within the rack, a smaller total electrical path length may be achieved. For example, the battery modules may be installed with their power ports at the right-rear within the left-hand column of the rack, but by inverting the vertical orientation of the battery modules they may be installed with their power ports at the left-rear within the right-hand column of the rack. Installing the batteries in this may allow the interconnecting busbar lengths to be minimized, thereby reducing cost, minimizing power circuit resistance, and minimizing the enclosed loop area for reduced EMI. Additionally, only one size/length of busbar may be required, simplifying supply chain production and further reducing cost. The battery modules may be appropriately designed to allow installation in either of the two vertical orientations described above, and are preferably symmetric about their horizontal midline.

The backplane assembly may comprise three separate vertical substructures, or planes. A first, 'power plane' may be closest to the rear of the battery modules and may contain the power distribution and communications media. In addition to ease of installation and cost reduction, this arrangement may have the further benefit that all the current carrying and power distribution elements are encased within a metallic structure, thereby providing electromagnetic shielding. Other desirable benefits may include:

automatic connection of the battery module to the backplane via battery insertion;

mitigation of the potential effects of radiated emissions on other nearby or adjacent equipment;

improvement of the radiated immunity of the battery system from potential effects from other nearby or adjacent equipment;

elimination of the need for power conductor shielding (when the rack is bonded to earth or a hull ground of a ship); and elimination of the need for insulating jackets on the conductors, as the conductors are completely enclosed and cannot be accessed during normal operation.

Adjacent the power plane may be the 'cooling plane'. In the case of an air-cooled battery rack, the rack may be equipped with an integrated air delivery system consisting of a central plenum distributing air horizontally to the base of each battery column. The plenum may in turn be connected to the backplane's cooling plane at the rear of the rack, directing air vertically behind each battery column. At the rear of each battery, air may be directed forward across each module's finned heat sink.

In the case of a liquid-cooled rack, the rack plenum and ducting integrated within the backplane may be configured with additional equipment to allow liquid delivery to each module. To allow connection with the liquid input and output on each module, the backplane may be equipped with mating connectors. The connectors may be loosely captured in the backplane assembly and connected via flexible hose to rigid fluid manifolds. In this way the fluid connection may allow for slight mechanical misalignment, and a correct fit and seal may be formed with minimal insertion force when mounting the battery module in a bay.

The rigid fluid manifolds, an inlet and an outlet, may be oriented vertically behind each battery column within the cooling plane, and may be sized to prevent excessive pressure drop. The vertical manifolds may be configured from hard plumbing lines and may be affixed to the backplane assembly, or preferably may be integrated channels formed via an extrusion process, and therefore entirely built into the backplane assembly. The vertical manifolds may be further connected at the top or bottom of the backplane into larger manifolds that serve an entire rack. Additionally, multiple racks may be interconnected, such that a single set of inlet/outlet port connections can service multiple racks.

The cooling system may be connected to an air blower and/or coolant chiller external to the rack. Either of these systems (air or liquid) may be controlled or accept commends from the pack controller in order to be activated and/or modulated based on information gathered from the individual battery modules. For instance, temperature sensors located to gather temperature data on the battery modules may provide such information to the pack controller via a communications system. Control may be further refined via integration with shipboard navigation equipment to take into account the geographical location of the vessel or ferry. For example, the geographical location (e.g. North Sea vs. South American coastal regions) may contribute to overall thermal management/cooling settings. Additionally, for certain types of vessels, i.e. ferries, the route information may be used as operational intelligence to allow for more efficient and optimal battery module cooling. For example, the battery pack is typically exercised more aggressively when a vessel is docking or undergoing charging while at dock. In this case the cooling system may be used to pre-cool the batteries before they are called upon to deliver a heavy load, such that battery temperature overshoot is avoided. Generally, keeping the temperature as steady and even as possible contributes positively to battery cell life.

Adjacent the cooling plane may be a third plane of the backplane assembly, the 'exhaust plane'. The exhaust plane provides a channel for directing exhaust gases away from the rack. The module exhaust ports connect into the backplane exhaust collector ports which in turn route exhaust gases through the power and cooling planes and into the exhaust plane, via exhaust channels.

The backplane exhaust system, being located within the third plane of the backplane assembly, may afford additional length to the exhaust channels. This may provide two system benefits. Firstly, the backplane exhaust channels may have sufficient length to allow them to be optionally fitted with flame arrestors in order to ensure any potential flame emanating from a module is fully quenched and does not enter the exhaust plane. Secondly, because the exhaust channels travel through the cooling plane, they can be integrated with the cooling system and thus be cooled in a similar way to the battery module. For an air-cooled system, the exhaust channels are preferably equipped with fins to allow efficient heat extraction. In the case of a liquid-cooled system, the exhaust channels may be formed into the inlet/outlet cooling manifolds to allow for efficient heat extraction. Additionally, because the cooling is adjacent the exhaust plane, in the case of air cooling the separating wall between the cooling and exhaust planes is preferably configured with heat sink fins to allow heat transfer from the exhaust plane into the cooling plane.

At the top of the exhaust plane there may be additional ducting such that exhaust gases may be further routed out of the rack assembly and to a safe external location, thus preventing exhaust gases from accumulating in the vicinity of the battery rack. The exhaust plane may be actively evacuated via an extraction pump providing negative pressure, and/or may be allowed to vent naturally upwards. In the case of an extraction pump/fan system, the system may be controlled via the pack controller and activated and/or modulated based on information gathered from temperature sensors (as described above). Additionally, the pack controller may act to ensure the cooling system remains in operation and may increase the power to the cooling system capacity during a potential module venting event to provide exhaust channel cooling as described above. The pack controller may also communicate with appropriate safety alarms, may activate appropriate visual indicators within the room housing the rack, and may disconnect the batteries from the backplane assembly if need be.

In a first aspect of the disclosure, there is provided a backplane assembly for engaging with a plurality of battery modules. The backplane assembly defines a battery module-receiving side and comprises separate substructures including a power substructure adjacent the battery module-receiving side and comprising electrical connectors arranged to engage with corresponding electrical connectors of one or more of the battery modules engaged with the backplane assembly. The backplane assembly further comprises a cooling substructure adjacent the power substructure, in fluid communication with the battery module-receiving side and arranged such that a cooling fluid moving through the cooling substructure is directed towards the battery module-receiving side so as to cool one or more of the battery modules engaged with the backplane assembly.

As used herein the term "adjacent" may mean directly adjacent, in that a single dividing barrier, or interface, separates one substructure from another substructure. Alternatively "adjacent" may mean indirectly adjacent, in that multiple barriers or interfaces may separate two adjacent substructures, but that no substructure as described in this disclosure separates two other adjacent substructures.

The backplane assembly according to the disclosure provides improved ease of maintenance of the battery modules, as there is no need to provide cabling at the front of the battery rack. The battery module-receiving side is a side of the backplane assembly on which battery modules are engaged with the backplane assembly.

The backplane assembly may further comprise a battery rack comprising: a front side; and a plurality of battery bays. The backplane assembly may define a rear side of the battery rack, and each battery bay may be configured to receive one of the battery modules through the front side of the battery rack. The battery rack may assist with guiding battery modules into engagement with the backplane assembly. The battery rack and backplane assembly may form a single integrated structure, with the backplane assembly forming a rear wall of the battery rack. Alternatively the battery rack and backplane assembly may be separate components that are coupled together and later may be decoupled one from the other.

The backplane assembly may further comprise an exhaust substructure adjacent the cooling substructure, in fluid communication with the battery module-receiving side and arranged such that exhaust gases vented by one or more of the battery modules engaged with the backplane assembly are directed away from the backplane assembly. Exhaust gases may therefore be safely evacuated away from the backplane assembly.

The electrical connectors of the power substructure may be positioned such that the electrical connectors engage with corresponding electrical connectors of one or more of the battery modules engaged with the backplane assembly. At least some of the electrical connectors of a battery module engaged with the backplane assembly may be positioned in a vertical alignment. The vertical alignment of the electrical connectors may contribute to reducing the electrical loop area of the backplane's interconnected electrical connectors, as discussed above.

The power substructure may further comprise communication ports positioned such that the communication ports engage with corresponding communication ports of one or more of the battery modules engaged with the backplane assembly. The communication ports may be optical ports and the engagement may comprise the optical ports of the power substructure being within optically communicative distance of the optical ports of the one or more battery modules engaged with the backplane assembly. The communication ports of the power substructure may be positioned in a vertical alignment.

The battery bays may be configured to receive battery modules by sliding a battery module into a battery bay via the front side of the battery rack until the battery module is in a mating position. In the mating position electrical connectors of the battery module may be engaged with the corresponding electrical connectors of the power substructure. As a result the need for additional cabling connecting the battery modules to the backplane assembly may be eliminated. In addition, disengagement of a battery module from the battery circuit is made more straightforward, with simple insertion/withdrawal of a battery module from its bay.

The engagement of the electrical connectors and/or the communication ports may be a blind mate engagement.

The power substructure may further comprise a plurality of busbars, each busbar arranged to interconnect two battery modules engaged with the backplane assembly. Advantageously, the power substructure and cooling substructure may be structured such that a cooling fluid moving within the cooling substructure is directed to the battery module-receiving side of the backplane assembly, via the power substructure. In other words the cooling substructure may be in fluid communication with both the power substructure and the battery module-receiving side of the backplane assembly. This may allow the power/communications connectors of the power substructure, as well as the bus bars, to be cooled when the cooling fluid moves from the cooling substructure to the battery module-receiving side of the backplane assembly.

The backplane assembly may further comprise at least one exhaust channel extending from the battery module-receiving side to the exhaust substructure and passing through the cooling substructure. Additional cooling of the exhaust gases may be provided by virtue of the exhaust channels passing through the cooling substructure. In addition, unwanted mixing of the exhaust gases with the coolant fluid may be avoided.

Each exhaust channel may define a channel portion passing through the cooling substructure. At least one of the channel portions may comprise a heat sink for assisting heat dissipation away from the exhaust channel.

Each substructure may be substantially physically separated from the other substructure or substructures.

The cooling substructure and the exhaust substructure may be separated by a barrier comprising a heat sink for drawing heat from the exhaust substructure into the cooling substructure.

Each of the substructures may be separated from its adjacent substructure or substructures by a substantially common barrier.

On the battery module-receiving side the backplane assembly may define a number of battery bays. The power substructure and the cooling substructure may be further arranged such that a cooling fluid moving through the cooling substructure is directed to channels separating adjacent battery bays. The battery bays may be the same bays as those of the battery rack described above, with the backplane assembly defining a rear wall of each battery bay when the rack is engaged with the backplane assembly.

The substructures may form a single integrated structure. Manufacturing of the backplane assembly may therefore be rendered simpler.

On the battery module-receiving side the backplane assembly a number of battery bays arranged in a two-dimensional array may be defined. The battery bays may be the same bays as those of the battery rack described above, with the backplane assembly defining a rear wall of each battery bay when the rack is engaged with the backplane assembly. Each column of battery bays may have a left half and a right half. For a column of battery bays, the electrical connectors of the power substructure may be positioned on one of the left half of the column and the right half of the column. This may allow for a single column of battery modules (when engaged with the backplane assembly) to have a smaller electrical loop area when compared to the prior art, allowing for reduced EMI. As used herein an "array" may be held to mean a rectangular arrangement of battery bays, a certain number of battery bays in width and a certain number of battery bays in height.

The array may be an even number of battery bays in width and may comprise one or more pairs of adjacent columns of battery bays. Each pair may define, when seen facing the battery module-receiving side, a left column and a right column. The electrical connectors of the power substructure may be positioned for the left column of battery bays on the right half of the left column, and for the right column of battery bays on the left half of the right column. Thus, even for multiple columns of battery modules, a smaller electrical loop area may be created when compared to the prior art, allowing for reduced EMI.

The array may be an odd number of battery bays in width and greater than two battery bays in width. The array may comprise: one or more pairs of adjacent columns of battery bays; and an odd column of battery bays. If the array comprises five or more columns then each pair of adjacent columns may be adjacent another pair of adjacent columns. Each pair of columns may define, when seen facing the battery module-receiving side, a left column and a right column. The electrical connectors of the power substructure may be positioned for each left column of battery bays on the right half of the left column, and for each right column of battery bays on the left half of the right column. The electrical connectors of the power substructure may be positioned for the odd column of battery bays on the same half of the odd column as those for the column adjacent the odd column.

Each column of battery bays may have a left edge and a right edge, the left edge and right edge separated by a distance d. For a column for which the electrical connectors of the power substructure are positioned on the left half of the column, the electrical connectors may be positioned no further from the left edge than 30%, 20% or 10% of d. For a column for which the electrical connectors of the power substructure are positioned on the right half of the column, the electrical connectors may be positioned no further from the right edge than 30%, 20% or 10% of d, respectively.

In a second aspect of the disclosure, there is provided a method of operating a plurality of electrically interconnected battery modules. Each battery module is engaged with a backplane assembly defining a battery module-receiving side and comprising separate substructures. The substructures include a power substructure adjacent the battery module-receiving side and comprising electrical connectors engaged with corresponding electrical connectors of the battery modules. The substructures further include a cooling substructure adjacent the power substructure and providing a fluid flow path from the cooling substructure to the battery module-receiving side. The method comprises using the electrical connectors to draw power from, or provide power to, one or more of the battery modules. The method further comprises directing a cooling fluid to flow from the cooling substructure to the battery module-receiving side.

The backplane assembly may further comprise an exhaust substructure adjacent the cooling substructure and providing a fluid flow path from the battery module-receiving side to the exhaust substructure.

In a third aspect of the disclosure, there is provided a backplane assembly for engaging with a plurality of battery modules. The backplane assembly defines a battery module-receiving side and comprises electrical connectors arranged to engage with corresponding electrical connectors of one or more of the battery modules engaged with the backplane assembly. On the battery module-receiving side the backplane assembly further defines a number of battery bays arranged in a two-dimensional array. Each column of battery bays has a left half and a right half. For a column of battery bays, the electrical connectors of the backplane assembly are positioned on one of the left half of the column and the right half of the column.

The array may be an even number of battery bays in width and may comprise one or more pairs of adjacent columns of battery bays. Each pair may define, when seen facing the battery module-receiving side, a left column and a right column. The electrical connectors of the backplane assembly may be positioned for the left column of battery bays on the right half of the left column, and for the right column of battery bays on the left half of the right column. Thus, even for multiple columns of battery modules, a smaller electrical loop area may be created when compared to the prior art, allowing for reduced EMI.

The array may be an odd number of battery bays in width and greater than two battery bays in width. The array may comprise: one or more pairs of adjacent columns of battery bays; and an odd column of battery bays. If the array comprises five or more columns then each pair of adjacent columns may be adjacent another pair of adjacent columns. Each pair of columns may define, when seen facing the battery module-receiving side, a left column and a right column. The electrical connectors of the backplane assembly may be positioned for the left column of battery bays on the right half of the left column, and for the right column of battery bays on the left half of the right column. The electrical connectors of the backplane assembly may be positioned for the odd column of battery bays on the same half of the odd column as those for the column adjacent the odd column.

Each column of battery bays may have a left edge and a right edge, the left edge and right edge separated by a distance d. For a column for which the electrical connectors of the backplane assembly are positioned on the left half of the column, the electrical connectors may be positioned no further from the left edge than 30%, 20% or 10% of d. For a column for which the electrical connectors of the backplane assembly are positioned on the right half of the column, the electrical connectors may be positioned no further from right edge than 30%, 20% or 10% of d, respectively.

Any feature described in connection with the first and second aspects of the disclosure may be readily combined with the third aspect of the disclosure. For instance, the backplane assembly of the third aspect may comprise a number of substructures such as power substructure, cooling substructure and exhaust substructure described in connection with the first and second aspects of the disclosure.

BRIEF DESCRIPTION OF THE DRAWINGS

Various embodiments of the disclosure will now be described in conjunction with the drawings, of which.

DETAILED DESCRIPTION OF SPECIFIC EMBODIMENTS

The present disclosure seeks to provide an improved backplane assembly. Whilst various embodiments of the disclosure are described below, the disclosure is not limited to these embodiments, and variations of these embodiments may well fall within the scope of the disclosure which is to be limited only by the appended claims.

Directional terms such as "top", "bottom", "upwards", "downwards", "vertically" and "laterally" are used in this disclosure for the purpose of providing relative reference only, and are not intended to suggest any limitations on how any article is to be positioned during use, or to be mounted in an assembly or relative to an environment.

Additionally, the term "couple" and variants of it such as "coupled", "couples", and "coupling" as used in this disclosure are intended to include indirect and direct connections unless otherwise indicated. For example, if a first article is coupled to a second article, that coupling may be through a direct connection or through an indirect connection via another article.

Furthermore, the singular forms "a", "an", and "the" as used in this disclosure are intended to include the plural forms as well, unless the context clearly indicates otherwise.

Figure 1:
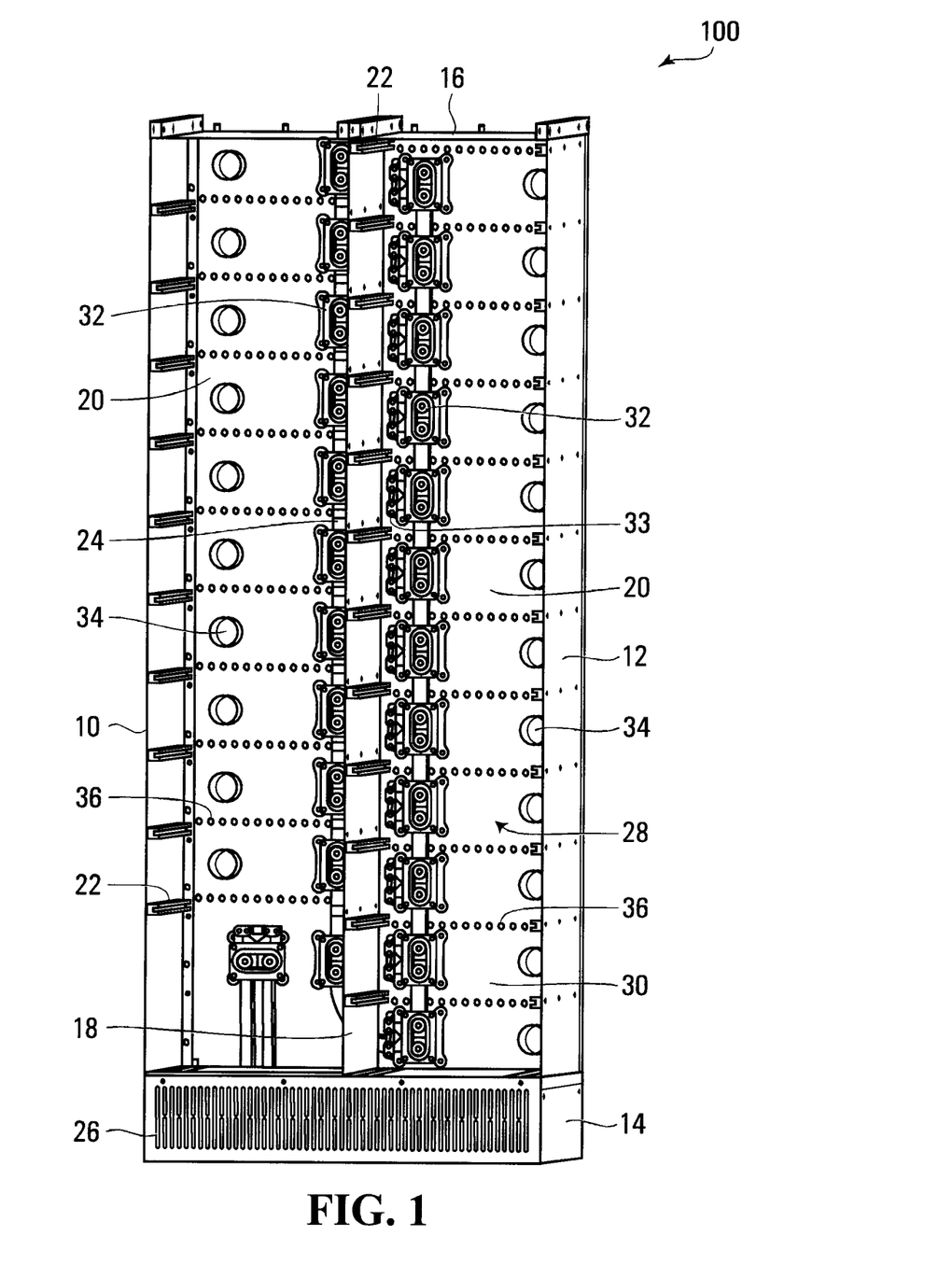
FIG. 1 is a perspective view of a rack assembly according to an embodiment of the disclosure.

Turning to FIG. 1, there is shown a rack assembly 100 in accordance with an embodiment of the present disclosure. Rack assembly 100 comprises side walls 10 and 12 joining a base 14 and a top 16. A dividing wall 18 extends from base 14 to top 16 and separates rack assembly 100 into a left-hand column and a right-hand column. Each column comprises multiple battery bays 20 for receiving battery modules. Each battery bay 20 is configured to receive or accept a single battery module though in other embodiments a battery bay may be configured to receive more than one battery module. Side walls 10, 12 and dividing wall 18 each comprise guiding members 22 for assisting proper alignment of battery modules during insertion of the battery modules into rack assembly 100. Base 14 houses an airflow chamber 23 (not seen in FIG. 1) beneath battery bays 20. The front of base 14 is provided with a vented duct 26 to allow the passage of air, as will be described in more detail below.

Rack assembly 100 further comprises a backplane assembly 28 defining a rear wall of rack assembly 100. The rear wall of rack assembly is said to be on a battery module-receiving side of backplane assembly 28. As will be described in more detail below (though not seen in FIG. 1), backplane assembly 28 comprises a number of sub-structures. In FIG. 1 only power substructure 30 is visible. Power substructure 30 forms a rear wall of each battery bay 20 and comprises a number of power connectors 32 and optical connectors 33 arranged to engage with or mate with corresponding power ports and optical ports on a battery module. Each battery bay 20 is therefore provided with a set of power connectors 32 and optical connectors 33 for engaging with a battery module inserted within the battery bay.

Busbars 24 are provided to interconnect two adjacent power connectors 32 such that electrical power may flow from one power connector 32 to another. The power connector 32 at lower left is used to connect to the ship's DC bus. Power connectors 32 and optical connectors 33 are positioned proximate dividing wall 18, and in the present embodiment are positioned within no further from dividing wall 18 than 20% of d, where d is a width of a battery bay 20. Note that although power substructure comprises both power and optical connectors, for simplicity it is referred to herein as "power substructure" rather than "power and communications substructure".

Power substructure 30 includes an exhaust port 34 provided in each battery bay. Each exhaust port 34 provides a fluid pathway extending from each battery bay 20 to the exhaust substructure 58 of backplane assembly 28, as will be described in more detail below. Power substructure 30 further includes a set of cooling apertures 36 provided in each battery bay 20. As will be described in more detail below, cooling apertures 36 assist in providing a fluid pathway from power substructure 30 to the cooling substructure 56.

Figure 3A:
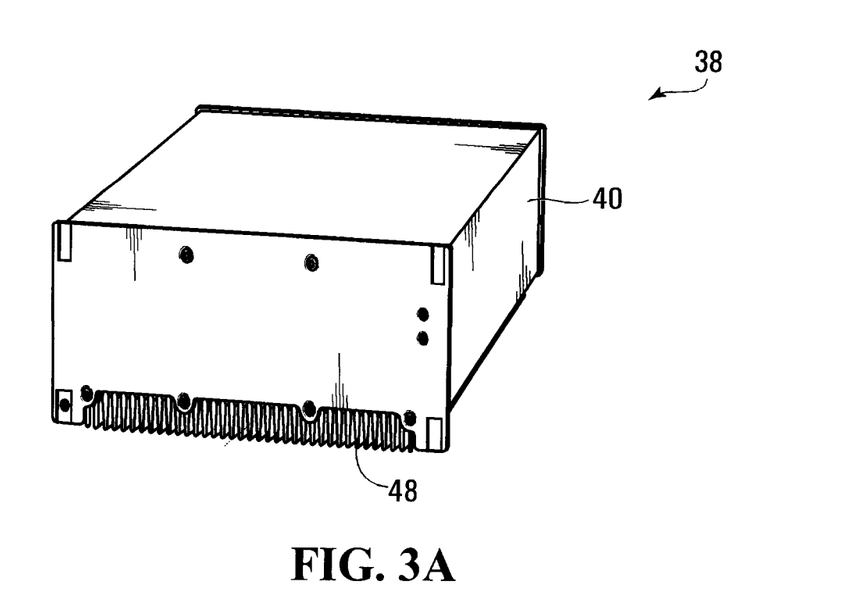
FIG. 3A is a perspective view of a front face of an air-cooled battery module that may be used with a rack assembly according to the present disclosure.
Figure 3B:
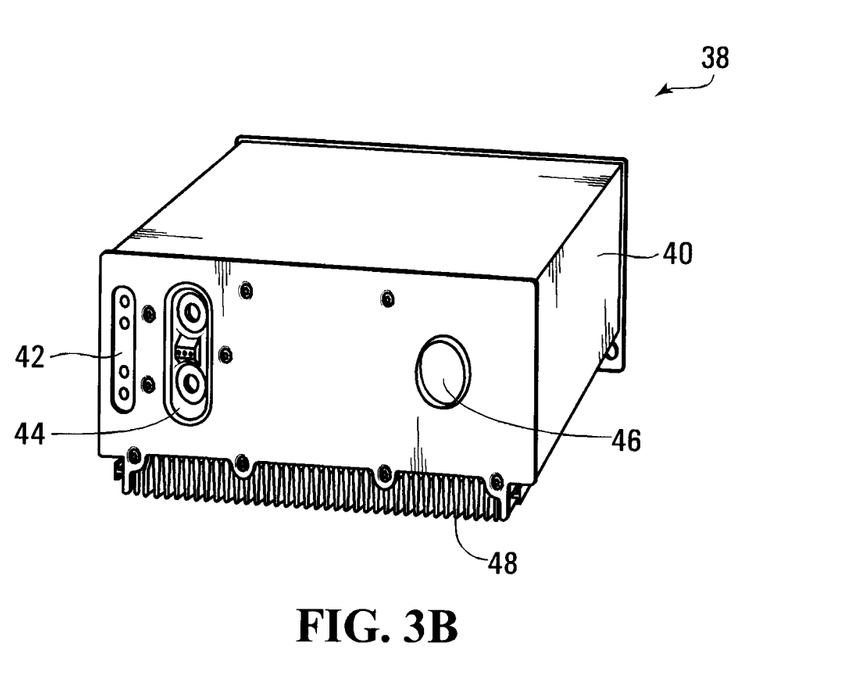
FIG. 3B is a perspective view of a rear face of the battery module of FIG. 3A.

FIG. 1 shows rack assembly 100 in an empty configuration. That is, in FIG. 1 rack assembly 100 is shown without any battery modules installed. Battery modules 38 and 50 such as those shown in FIGS. 3A, 3B, 4A and 4B may be used with rack assembly 100. Turning to FIGS. 3A and 3B, there is shown an embodiment of a battery module 38 that may installed in rack assembly 100. FIG. 3A shows a front view of battery module 38 and FIG. 3B shows a rear view of battery module 38. Battery module 38 houses (though not a shown) a number of cells disposed in a stacked arrangement within an enclosure 40. On the rear face of battery module 38 there is shown optical communication ports 42, power ports 44 and exhaust seal 46. Optical communication ports 42 are positioned in a vertical alignment, as are power ports 44. On the underside of battery module 38 is provided a heat sink 48 comprising a finned arrangement for assisting heat dissipation away from battery module 38. Battery module 38 is an air-cooled battery module as it does not include any ports for cooling battery module 38 via liquid means.

Figure 4A:
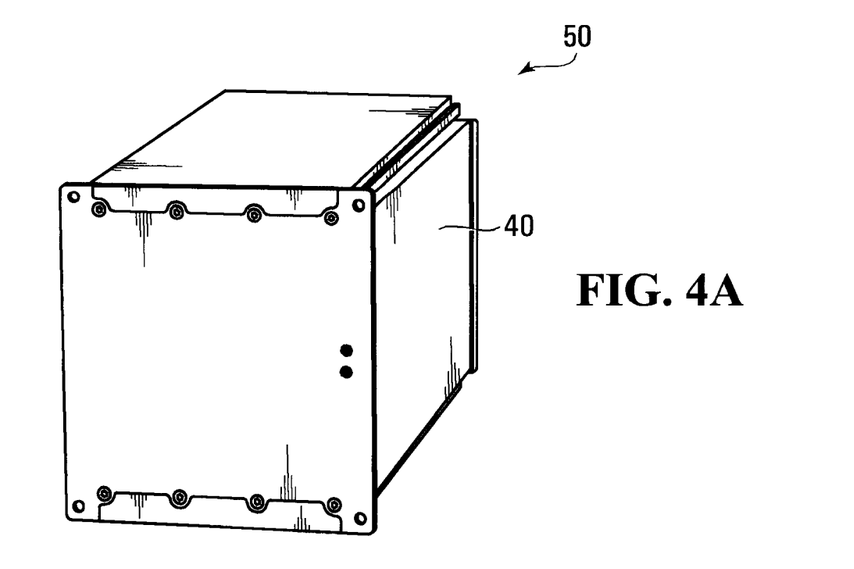
FIG. 4A is a perspective view of a front face of a liquid-cooled battery module that may be used with a rack assembly according to the present disclosure.
Figure 4B:
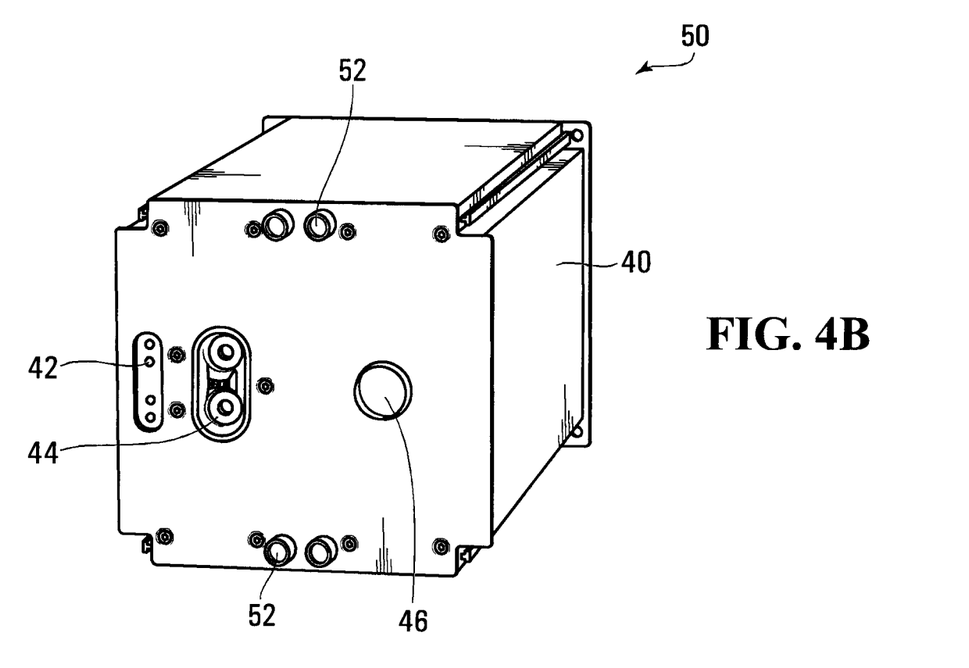
FIG. 4B is a perspective view of a rear face of the battery module of FIG. 4B.

FIGS. 4A and 4B show a similar embodiment of a battery module that may be used in accordance with the present disclosure. FIGS. 4A and 4B depict battery module 50 similar in design to battery module 38. Like features are therefore indicated with like reference numbers. However, unlike battery module 38, battery module 50 is liquid-cooled and to this end is provided with coolant inlet and outlet 52 on the rear face of battery module 50. In use, battery modules (such as battery modules 38 and 50) are installed in a rack assembly by sliding a battery module into a vacant battery bay of the rack assembly. In the embodiment of FIG. 1, rack assembly 100 is design to receive a plurality of battery modules 38 (i.e. air-cooled battery modules). When inserting battery module 38 into a vacant battery bay 20, guiding members 22 provided on side walls 10, 12 and dividing wall 18 assist in properly aligning battery module 38 during insertion.

Due to the positioning of power connectors 32, optical connectors 33 and exhaust ports 34 of power substructure 30, insertion of battery module 38 within a battery bay 20 results in optical ports 42, power ports 44 and exhaust seal 46 of battery module 38 engaging with the corresponding connectors of power substructure 30. That is, optical ports 42 engage with optical connectors 33, power ports 44 engage with power connectors 32, and exhaust seal 46 engages with exhaust port 34. Engagement of optical ports 42 with optical connectors 33, engagement of power ports 44 with power connectors 32, and engagement of exhaust seal 46 with exhaust port 34 comprises a blind mate engagement as known in the art. Engagement of optical ports 42 with corresponding optical connectors 33 means that optical ports 42 are brought into optically communicative proximity of optical connectors 33. With the blind mating described above, there is no need for a user to manually connect each battery module 38 to backplane 28. The optical and electrical engagement of each battery module 38 with backplane 28 is assured by the proper alignment of optical/power ports 42/44 with optical/power connectors 33/32, and the proper alignment of exhaust seal 46 and exhaust port 34, on both the rear face of battery module 38 and on power substructure 30.

Although not shown in the drawings, battery module 50 shown in FIGS. 4A and 4B may be installed in a rack assembly having a backplane with fluid ports configured to engage with, in a blind mate manner, corresponding fluid ports 52 on the rear face of battery module 50.

When installing battery modules 38 in rack assembly 100, for the battery bays on the left-hand side of rack assembly 100 (as seen in FIG. 1), battery module 38 is inserted with heat sink 48 facing towards base 14. For the battery bays on the right-hand side of rack assembly 100, battery modules 38 must be inserted upside down relative to battery modules 38 in the left-hand bays, in order for the connections on the rear face of battery module 38 to engage with the corresponding connections on power substructure 30. In other words, for the battery bays on the right-hand side of rack assembly 100, battery module 38 is inserted with heat sink 48 facing away from base 14.

Figure 2:
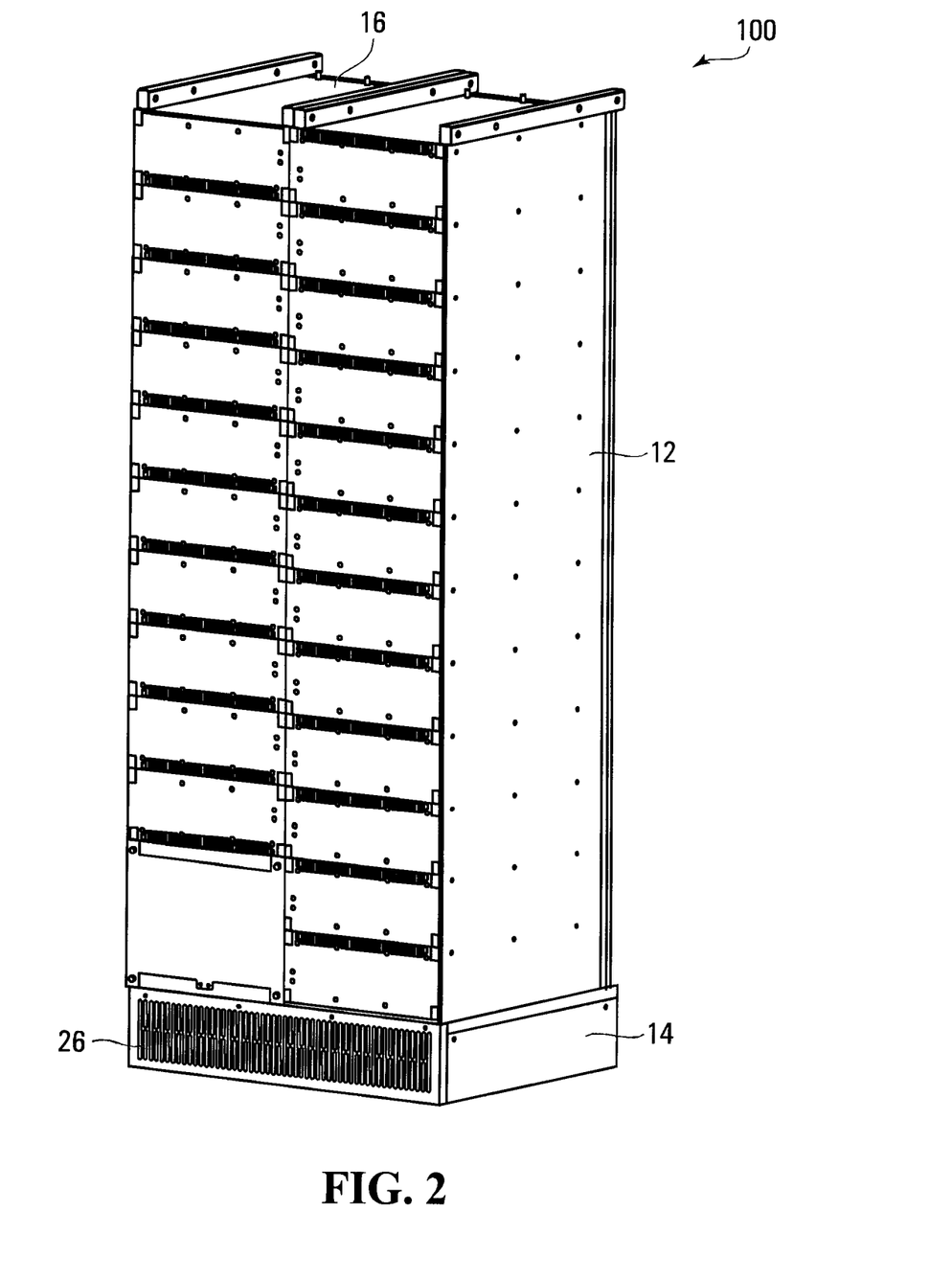
FIG. 2 is a perspective view of the rack assembly of FIG. 1, fully loaded with battery modules.

A fully filled rack assembly 100 is shown in FIG. 2. Each battery bay 20 contains a battery module 38 inserted therein, each battery module being blind-matingly engaged with power substructure 30 of backplane 28. As will be described in more detail below, a space or air-cooling channel 62 exists between two vertically adjacent battery modules to allow the passage air. For the battery modules in the left-hand column, this space also accommodates heat sink 48 of the uppermost battery module in a battery module pair whereas, for the battery modules in the right-hand column, this space also accommodates heat sink 48 of the lowermost battery module in a battery module pair.

Figure 5A:
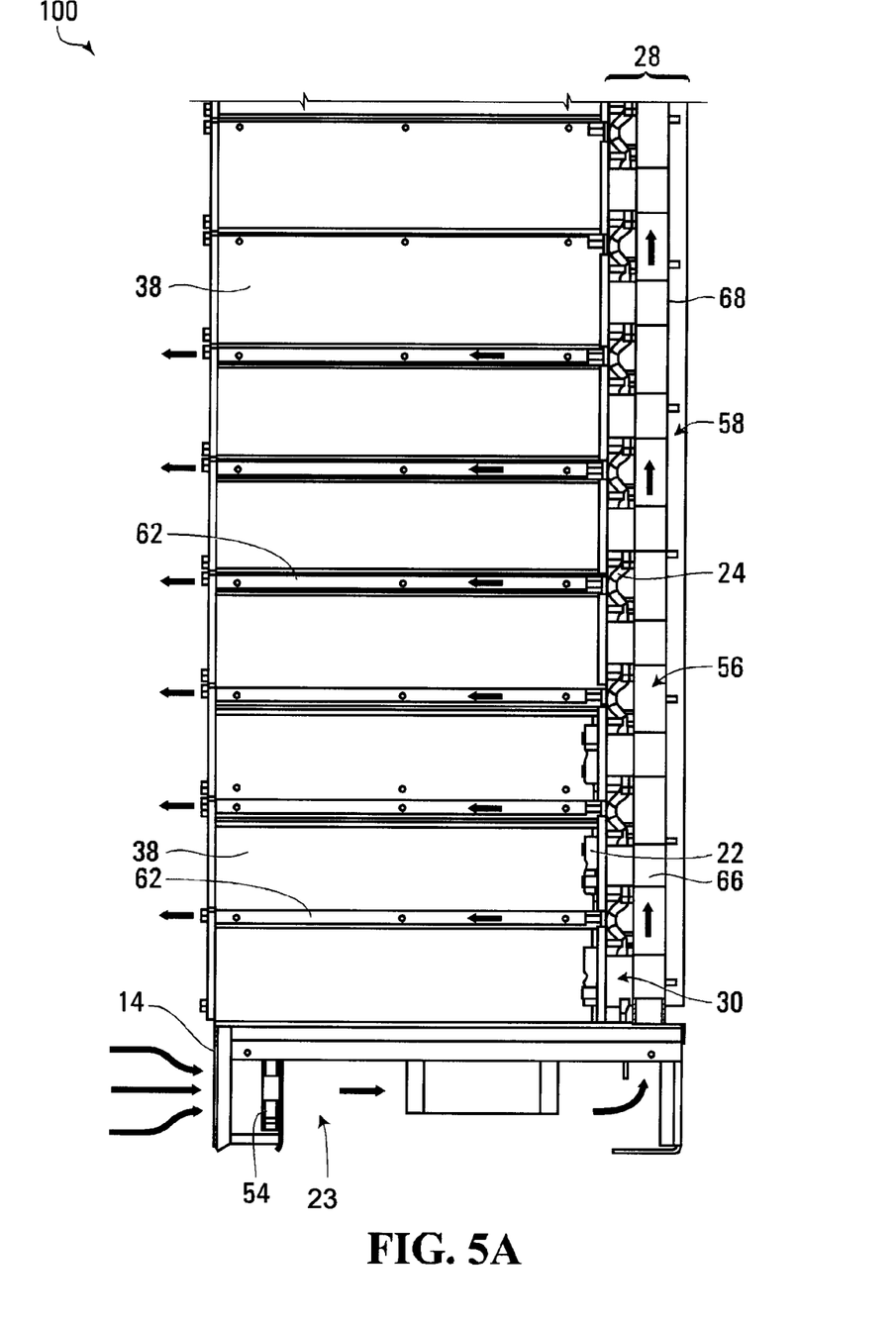
FIG. 5A is a cross-sectional side-on view of the rack assembly of FIG. 2.
Figure 5B:
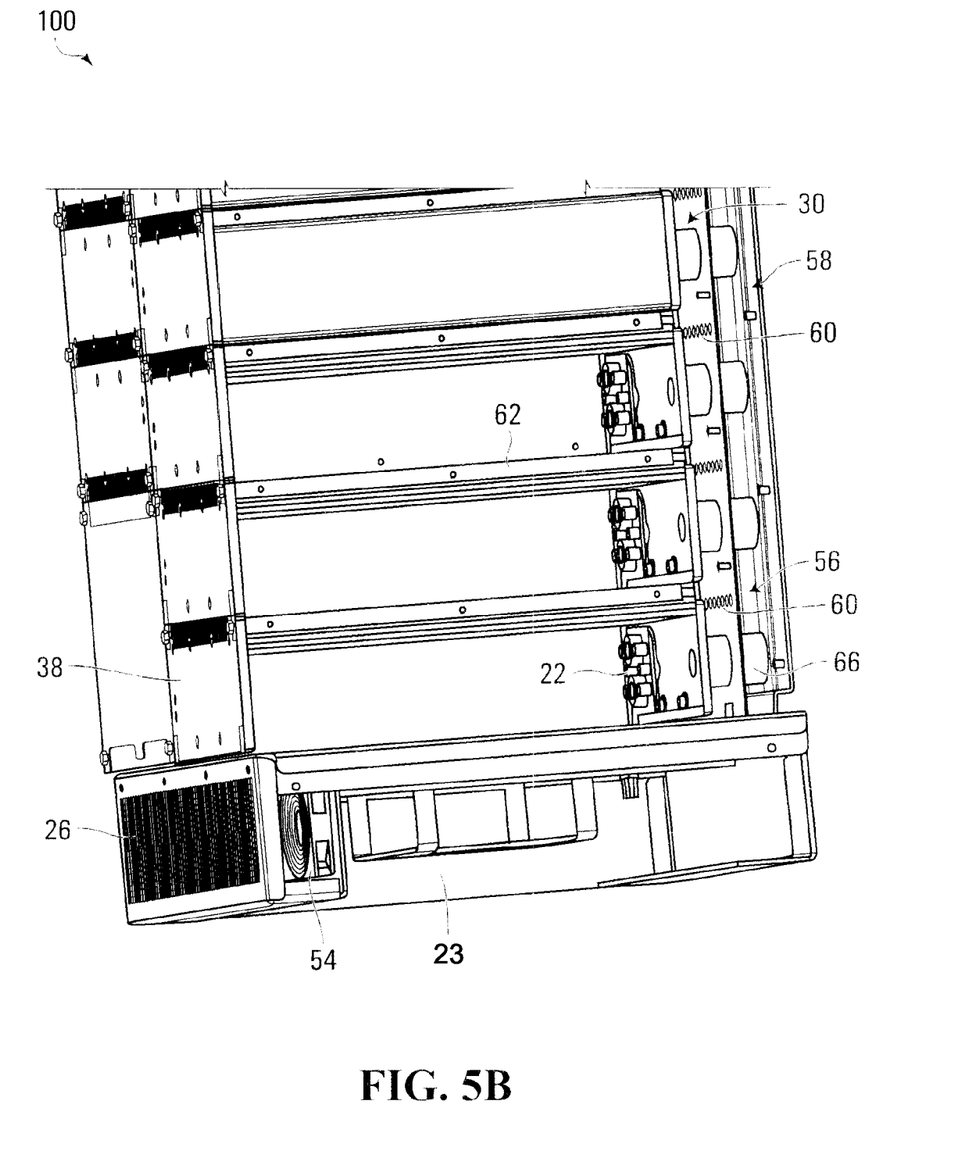
FIG. 5B is a cross-sectional perspective view of the rack assembly of FIG. 2.

Now turning to FIG. 5, there is shown a cross-sectional view of fully filled rack assembly 100. Airflow chamber 23 of base 14 comprises a fan assembly 54 for drawing air into airflow chamber 23. Backplane 28 is shown in more detail, and in particular each of three vertical substructures of backplane 28 is shown in more detail: power substructure 30, a cooling, substructure 56 and an exhaust substructure 58.

As already described, power substructure 30 comprises power connectors 32 and optical connectors 33 connected to corresponding power ports 44 and optical ports 42 of battery modules 38. Busbars 24 can be seen interconnecting vertically adjacent power connectors 32 such that vertically adjacent battery modules 38 are connected in series. Power substructure 30 is preferably entirely encased in metal so as to provide EMI shielding to electrical components comprised in power substructure 30.

Adjacent and behind power substructure 28 is cooling substructure 56. Cooling substructure 56 provides a fluid communication pathway extending from airflow chamber 23 to each battery bay 20. To achieve this, rack assembly 100 includes one or more apertures (not seen) allowing air drawn into airflow chamber 23 by fan assembly 54 and via duct 26 to flow upwards into a volume defined by cooling substructure 56. Turning briefly to FIG. 5B, cooling substructure 56 is shown from a different angle to illustrate cooling apertures 60 provided in cooling substructure 56 to allow airflow from cooling substructure 56 to reach battery bays 20 via cooling apertures 36 (not seen) in power substructure 28. The top of cooling substructure 56 is sealed from the exterior of rack assembly 100 such that air drawn into cooling substructure 56 is forced through cooling apertures 60, subsequently through cooling apertures 36 (not seen in FIGS. 5A and 5B) in power substructure 30 and along air-cooling channels 62

Figure 6:
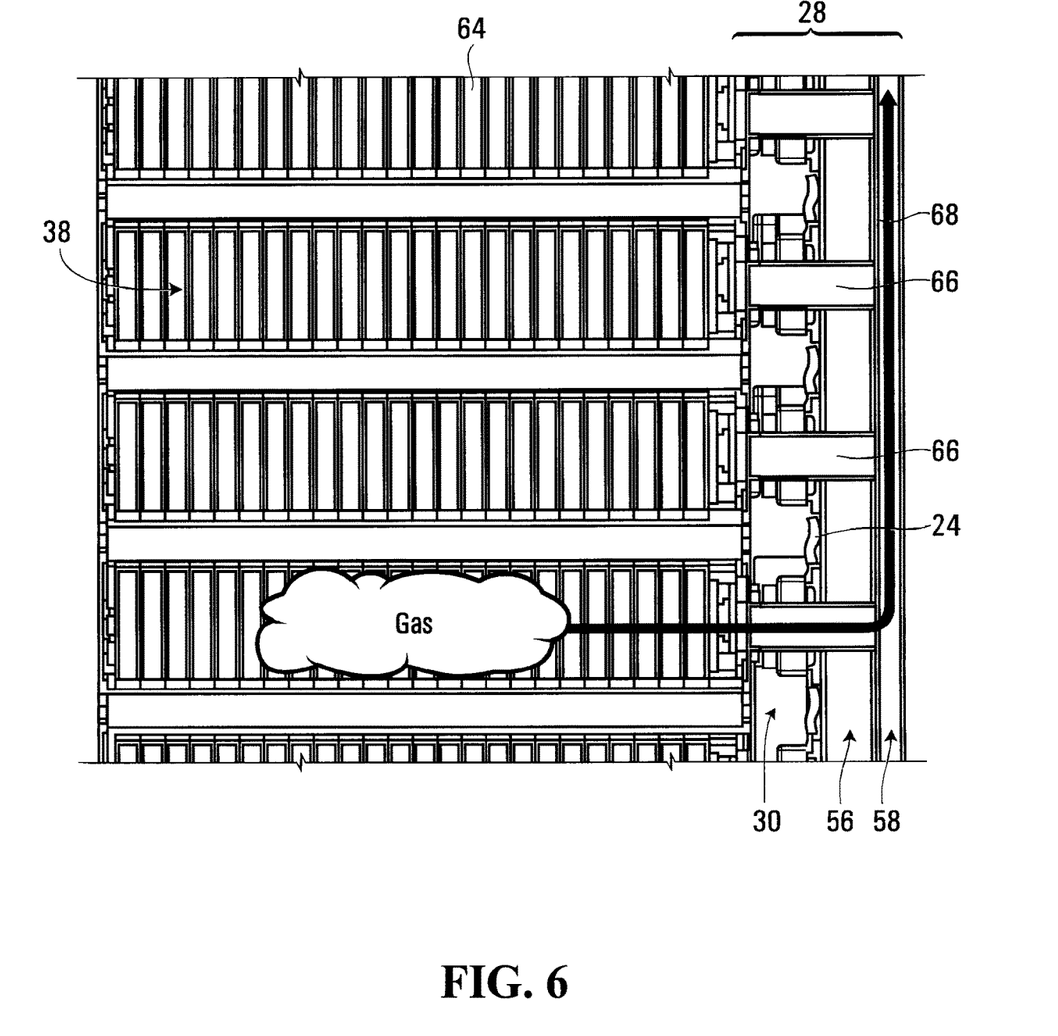
FIG. 6 is a cross-sectional side-on view of a rack assembly according to an embodiment of the disclosure.

Exhaust substructure 58 is positioned adjacent and behind cooling substructure 56. Thus, exhaust substructure 58 is the substructure furthest from battery bays 20. Cooling substructure 56 and exhaust substructure 58 share a common interface or barrier 68. Exhaust substructure 58 provides a volume in which exhaust gases from one or more of battery modules 38 may be directed away from rack assembly 100. Turning to FIG. 6, there is shown a magnified cross-section of the rack assembly seen in FIGS. 5A and 5B. Battery modules 38 are shown in cross-section to illustrate the stacked arrangement of cells 64 within each battery module 38. Exhaust channels 66 extend from each exhaust port 34 in power substructure 30 to an exhaust volume defined by exhaust substructure 58, passing through cooling substructure 56. At the top of rack assembly 100, exhaust substructure 58 is not sealed such that a fluid flow path is formed from each battery module 38 to the exterior of rack assembly 100.

In use, multiple battery modules 38 are mounted into rack assembly 100 until rack assembly 100 is filled, either partially or fully. As described above, to mount a battery module 38 into rack assembly 100, battery module 38 is inserted rear face first into a vacant battery bay 20. Battery module 38 is inserted fully into battery bay 20 until reaching a mating position, wherein in the mating position optical ports 42 and power ports 44 (of battery module 38) blind matingly engage with optical connectors 33 and power connectors 32 (of power substructure 30), and exhaust seal 46 (of battery module 38) blind matingly engages with exhaust port 34 (of power substructure 30). Guiding members 22 assist with proper alignment of the battery module 38's connectors/ports relative to the corresponding connectors/ports on power substructure 30.

During operational use of the battery pack, and as known in the art, electrical energy is drawn from each of battery modules 38, through the use of power connectors 32 of power substructure 30, and used for operation of the vessel's various functions. Cooling of the battery modules is of high importance during operation of the battery modules, in order to ensure efficient use of the battery modules as well as to avoid a potential thermal runaway. To this end, in the present embodiment fan assembly 54 is used to draw exterior air into airflow chamber 23. The air is pushed into cooling substructure 56 where it is then directed through cooling apertures 60 formed within cooling substructure 56, and subsequently through cooling apertures 36 formed within power substructure 30. Cooling apertures 36 are in fluid communication with air-cooling channels 62 separating vertically adjacent battery modules 30 (as well as accommodating heat sinks 48). Heat sinks 48 assist in transferring thermal energy emanated by operational battery modules 38 to the air flowing through air-cooling channels 62. The air is then ejected through the front of rack assembly 100 as seen in FIG. 5A. Arrows in FIG. 5A indicate the direction of airflow.

In the case of a thermal runaway, exhaust gases will accumulate in the battery module 38, as seen in FIG. 6. Continued release of exhaust gases will cause the seal on exhaust seal 46 to open, thereby forming a fluid communication path from battery module 38 to exhaust substructure 58. The exhaust gases will flow through exhaust seal 46 engaged with exhaust port 34, along exhaust channel 66 and into exhaust substructure 58. The exhaust gases are then directed upwards, out of exhaust substructure 58 preferably to a location separate from the room housing rack assembly 100. Cooling of the exhaust gases is augmented by having exhaust channels 66 pass directly through cooling substructure 56. The provision of a heat sink (not shown) on each portion of each exhaust channel 66 passing through cooling substructure 56 will further assist with cooling of the exhaust gases. As the exhaust gases are directed upwardly along exhaust substructure 58, the exhaust gases are further cooled by conduction of the thermal energy through interface 68. Still further, one or more heat sinks may be provided on interface 68 separating cooling substructure 56 from exhaust substructure 58, to further assist with cooling. Due to the physical separation of exhaust channels 66 from cooling substructure 56, there is no mixing of the exhaust gases with the air moving through cooling substructure 56. In some embodiments exhaust channels 66 may be fitted with flame arrestors (not shown) to prevent flames emanating from a battery module 38 experiencing thermal runaway from reaching exhaust substructure 58.

Whilst the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification can be implemented or combined with any part of any other aspect or embodiment discussed in this specification.

Figure 7:
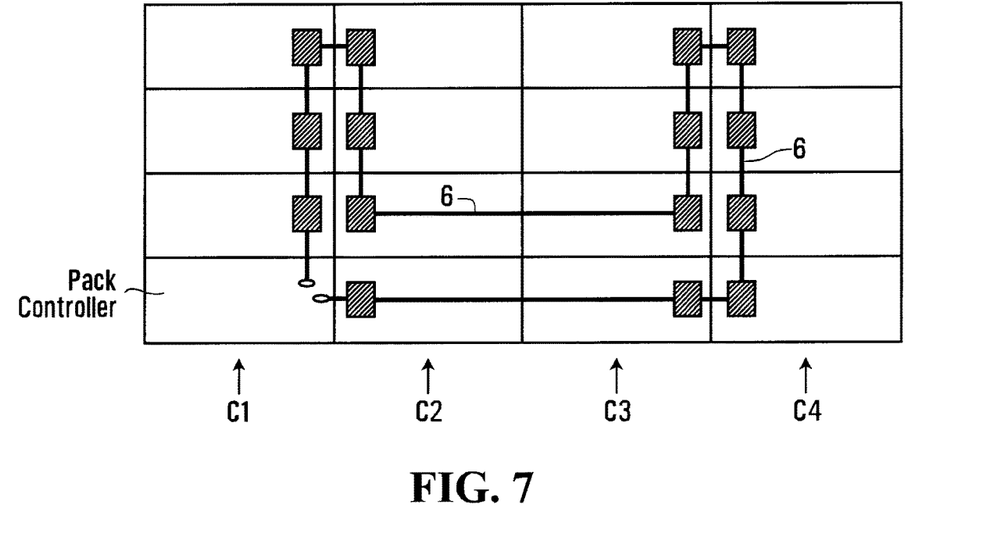
FIG. 7 is a schematic representation of a rack assembly comprising a four-by-four array of battery bays, in accordance with an embodiment of the disclosure.

For example, whilst the rack assembly of FIG. 1 comprises an array of battery bays two bays in width and twelve bays in height, it is to be understood that any array of battery bays may be used with the present disclosure. For example, the rack assembly may comprise a single column of battery bays, or may comprise an array that is more than two bays in width FIG. 7 is a schematic representation of an array of battery bays that is four bays in width (numbered C1 through C4) and four bays in height. In this exemplary embodiment, the power connectors are located on the right halves of columns C1 and C3, and on the left halves of columns C2 and C4. Thus, when the power connectors are interconnected with busbars 6, the resulting electrical loop area is minimised in relation to the same array but with the power connectors centralised in each bay.

Figure 8:
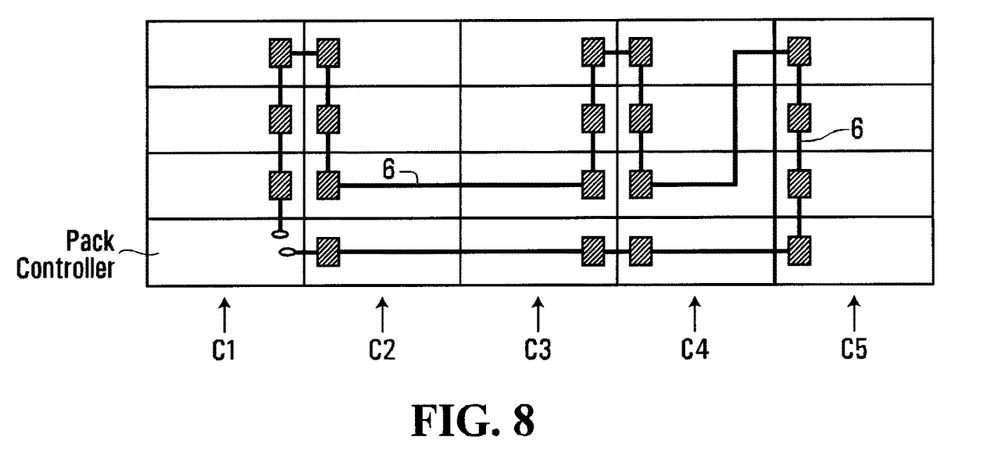
FIG. 8 is a schematic representation of a rack assembly comprising a five-by-four array of battery bays, in accordance with an embodiment of the disclosure.

FIG. 8 is a schematic representation of an array of battery bays that is five bays in width (numbered C1 through C5) and four bays in height. In this exemplary embodiment, the power connectors are located on the right halves of columns C1 and C3, and on the left halves of columns C2, C4 and C5. Thus, when the power connectors are interconnected with busbars 6, the resulting electrical loop area is minimised in relation to the same array but with the power connectors centralised in each bay.

Furthermore, whilst the rack assembly of the present disclosure has been described in connection with its use in the maritime industry, the rack assembly could equally well be used in other industries, to allow for any energy storing device to be mounted in the rack and engaged with the backplane assembly. It will also become apparent from the foregoing that the backplane assembly may function separately from the rack. For example in certain cases the backplane assembly could be incorporated into a wall, and battery modules may be engaged with the backplane assembly without the need for a rack. For instance the power connections of the backplane assembly may be recessed within the power substructure such that the power substructure provides a degree of support to any battery modules engaged with it.

Accordingly, the disclosure is to be limited in scope only by the claims that follow.

The invention claimed is:

1. A backplane assembly for engaging with a plurality of battery modules, the backplane assembly defining a battery module-receiving side and comprising separate substructures on a side opposite the battery module-receiving side, the separate substrates including:
   a power substructure adjacent the battery module-receiving side and comprising electrical connectors arranged to engage with corresponding electrical connectors of one or more of the battery modules engaged with the backplane assembly; and
   a cooling substructure adjacent the power substructure, in fluid communication with the battery module-receiving side and arranged such that a cooling fluid moving through the cooling substructure is directed towards the battery module-receiving side so as to cool one or more of the battery modules engaged with the backplane assembly, wherein the cooling substructure is further arranged such that a cooling fluid introduced to the cooling substructure moves through the cooling substructure before reaching the battery module-receiving side; and
   an exhaust substructure having at least one exhaust channel, the exhaust substructure adjacent the cooling substructure, in fluid communication with the battery module-receiving side and arranged such that exhaust gases vented by one or more of the battery modules engaged with the backplane assembly are directed away from the backplane assembly,
   wherein, due to the physical separation of the at least one exhaust channel from the cooling substructure, there is no mixing of the exhaust gases and air moving through the cooling substructure.

2. The backplane assembly of claim 1, further comprising a battery rack comprising: a front side; and a plurality of battery bays, the backplane assembly defining a rear side of the battery rack, and each battery bay configured to receive one of the battery modules through the front side of the battery rack.

3. The backplane assembly of claim 1, wherein the electrical connectors of the power substructure are positioned such that the electrical connectors engage with corresponding electrical connectors of one or more of the battery modules engaged with the backplane assembly.

4. The backplane assembly of claim 3, wherein at least some of the electrical connectors of a battery module engaged with the backplane assembly are positioned in a vertical alignment.

5. The backplane assembly of claim 1, wherein the power substructure further comprises communication ports positioned such that the communication ports engage with corresponding communication ports of one or more of the battery modules engaged with the backplane assembly.

6. The backplane assembly of claim 2, wherein the battery bays are configured to receive battery modules by sliding a battery module into a battery bay via the front side of the battery rack until the battery module is in a mating position, wherein in the mating position electrical connectors of the battery module are engaged with the corresponding electrical connectors of the power substructure.

7. The backplane assembly of claim 5, wherein the engagement of the electrical connectors and/or the communication ports is a blind mate engagement.

8. The backplane assembly of claim 1, wherein the power substructure further comprises a plurality of busbars, each busbar arranged to interconnect two battery modules engaged with the backplane assembly.

9. The backplane assembly of claim 1, the at least one exhaust channel extending from the battery module-receiving side to the exhaust substructure and passing through the cooling substructure.

10. The backplane assembly of claim 9, each exhaust channel defining a channel portion passing through the cooling substructure, and wherein at least one of the channel portions comprises a heat sink for assisting heat dissipation away from the exhaust channel.

11. The backplane assembly of claim 1, wherein each of the power substructure, the cooling substructure and the exhaust substructure are substantially physically separated from each other.

12. The backplane assembly of claim 1, wherein the cooling substructure and the exhaust substructure are separated by a barrier comprising a heat sink for drawing heat from the exhaust substructure into the cooling substructure.

13. The backplane assembly of claim 1, wherein each of the power substructure, the cooling substructure and the exhaust substructure are separated from each other by a substantially common barrier.

14. The backplane assembly of claim 1, wherein on the battery module-receiving side the backplane assembly defines a number of battery bays, and wherein the power substructure and the cooling substructure are further arranged such that a cooling fluid moving through the cooling substructure is directed to channels separating adjacent battery bays.

15. The backplane assembly of claim 1, wherein the power substructure, the cooling substructure and the exhaust substructure form a single integrated structure.

16. The backplane assembly of claim 1, wherein on the battery module-receiving side the backplane assembly defines a number of battery bays arranged in a two-dimensional array, each column of battery bays having a left half and a right half, and wherein, for a column of battery bays, the electrical connectors of the power substructure are positioned on one of the left half of the column and the right half of the column.

17. The backplane assembly of claim 16, wherein the array is an even number of battery bays in width and comprises one or more pairs of adjacent columns of battery bays, each pair defining, when seen facing the battery module-receiving side, a left column and a right column, and wherein the electrical connectors of the power substructure are positioned for the left column of battery bays on the right half of the left column, and for the right column of battery bays on the left half of the right column.

18. The backplane assembly of claim 16, wherein the array is an odd number of battery bays in width and greater than two battery bays in width, wherein the array comprises: one or more pairs of adjacent columns of battery bays; and an odd column of battery bays, wherein if the array comprises five or more columns then each pair of adjacent columns is adjacent another pair of adjacent columns, wherein each pair defines, when seen facing the battery module-receiving side, a left column and a right column, wherein the electrical connectors of the power substructure are positioned for each left column of battery bays on the right half of the left column, and for each right column of battery bays on the left half of the right column, and wherein the electrical connectors of the power substructure are positioned for the odd column of battery bays on the same half of the odd column as those for the column adjacent the odd column.

19. The backplane assembly of claim 16, wherein each column of battery bays has a left edge and a right edge, the left edge and right edge separated by a distance d, and wherein, for a column for which the electrical connectors of the power substructure are positioned on the left half of the column, the electrical connectors are positioned no further from the left edge than 30% of d, and, for a column for which the electrical connectors of the power substructure are positioned on the right half of the column, the electrical connectors are positioned no further from the right edge than 30% of d, respectively.

20. A backplane assembly according to claim 1, further comprising one or more battery modules engaged with the backplane assembly and electrically connected to the backplane assembly.

21. A method of operating a plurality of electrically interconnected battery modules, each battery module engaged a backplane assembly defining a battery module-receiving side and comprising separate substructures on a side opposite the battery module-receiving side, the separate substructures including:
 a power substructure adjacent the battery module-receiving side and comprising electrical connectors engaged with corresponding electrical connectors of the battery modules; and
 a cooling substructure adjacent the power substructure and providing a fluid flow path from the cooling substructure to the battery module-receiving side and
 an exhaust substructure having at least one exhaust channel, the exhaust substructure adjacent the cooling substructure, in fluid communication with the battery module-receiving side and arranged such that exhaust gases vented by one or more of the battery modules engaged with the backplane assembly are directed away from the backplane assembly,
the method comprising:
 using the electrical connectors to draw power from, or provide power to, one or more of the battery modules; and
 directing a cooling fluid to flow from the cooling substructure to the battery module-receiving side such that the cooling fluid moves through the cooling substructure before reaching the battery module-receiving side
 wherein, due to the physical separation of the exhaust channel from the cooling substructure, there is no mixing of the exhaust gases and air moving through the cooling substructure.

22. The method of claim 21, the backplane assembly further comprising an exhaust substructure adjacent the cooling substructure and providing a fluid flow path from the battery module-receiving side to the exhaust substructure.

* * * * *